Figure 1:
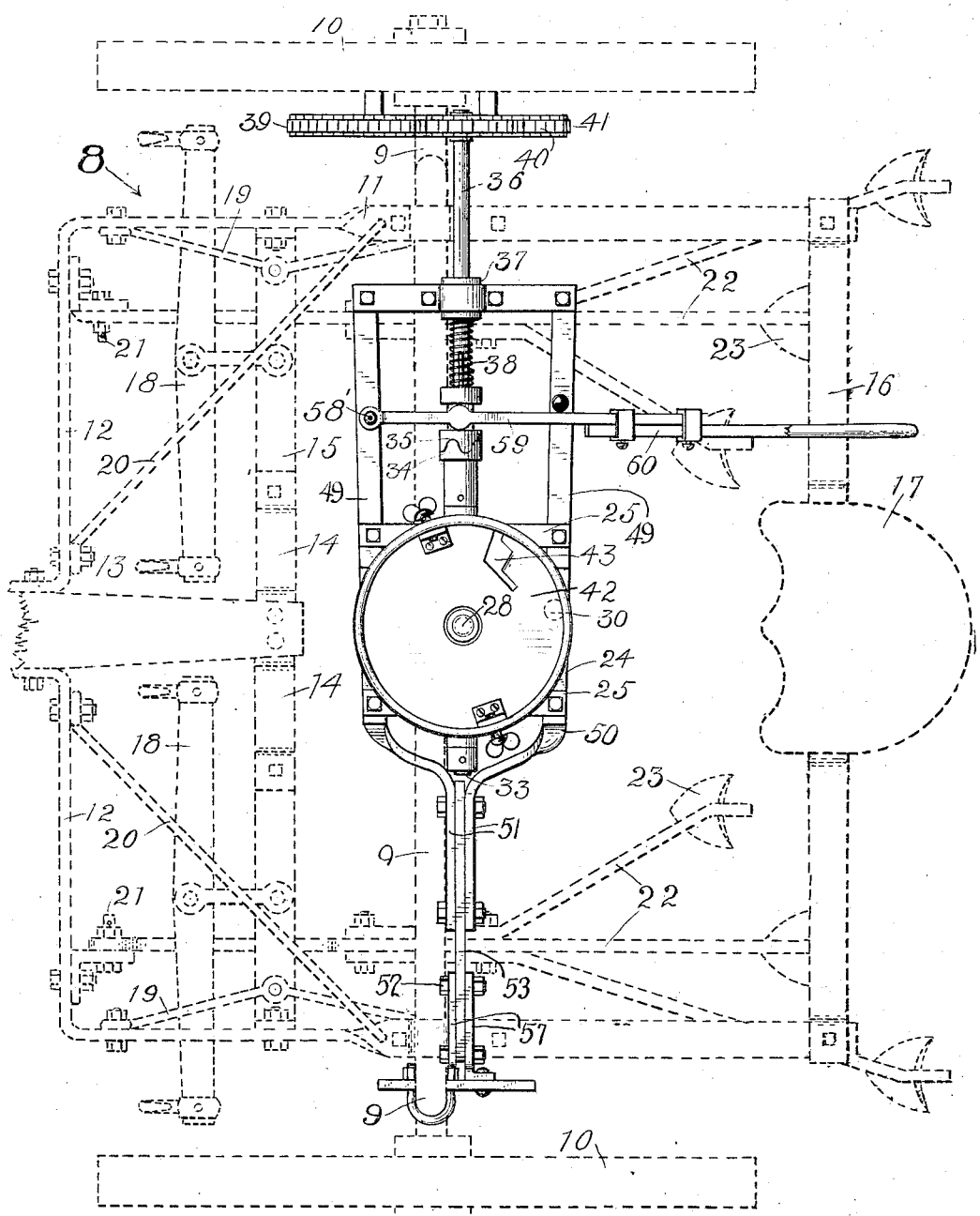

W. FAUST.
REPLANTING ATTACHMENT FOR CULTIVATORS.
APPLICATION FILED OCT. 30, 1909.

961,290.

Patented June 14, 1910.

3 SHEETS—SHEET 1.

Witnesses,
S. P. Buck.

Inventor,
William Faust.
By Chandlee & Chandlee
Attorneys.

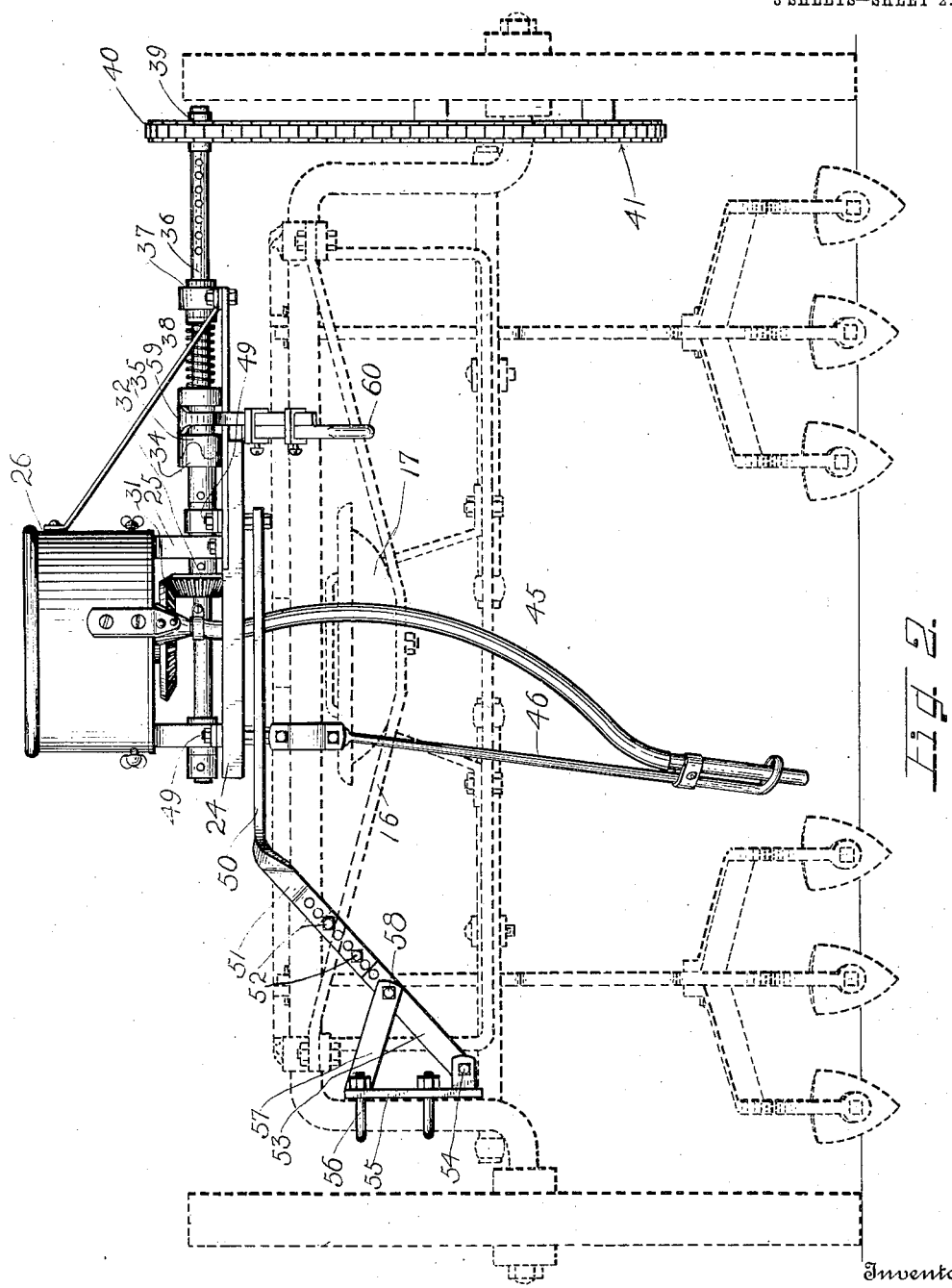

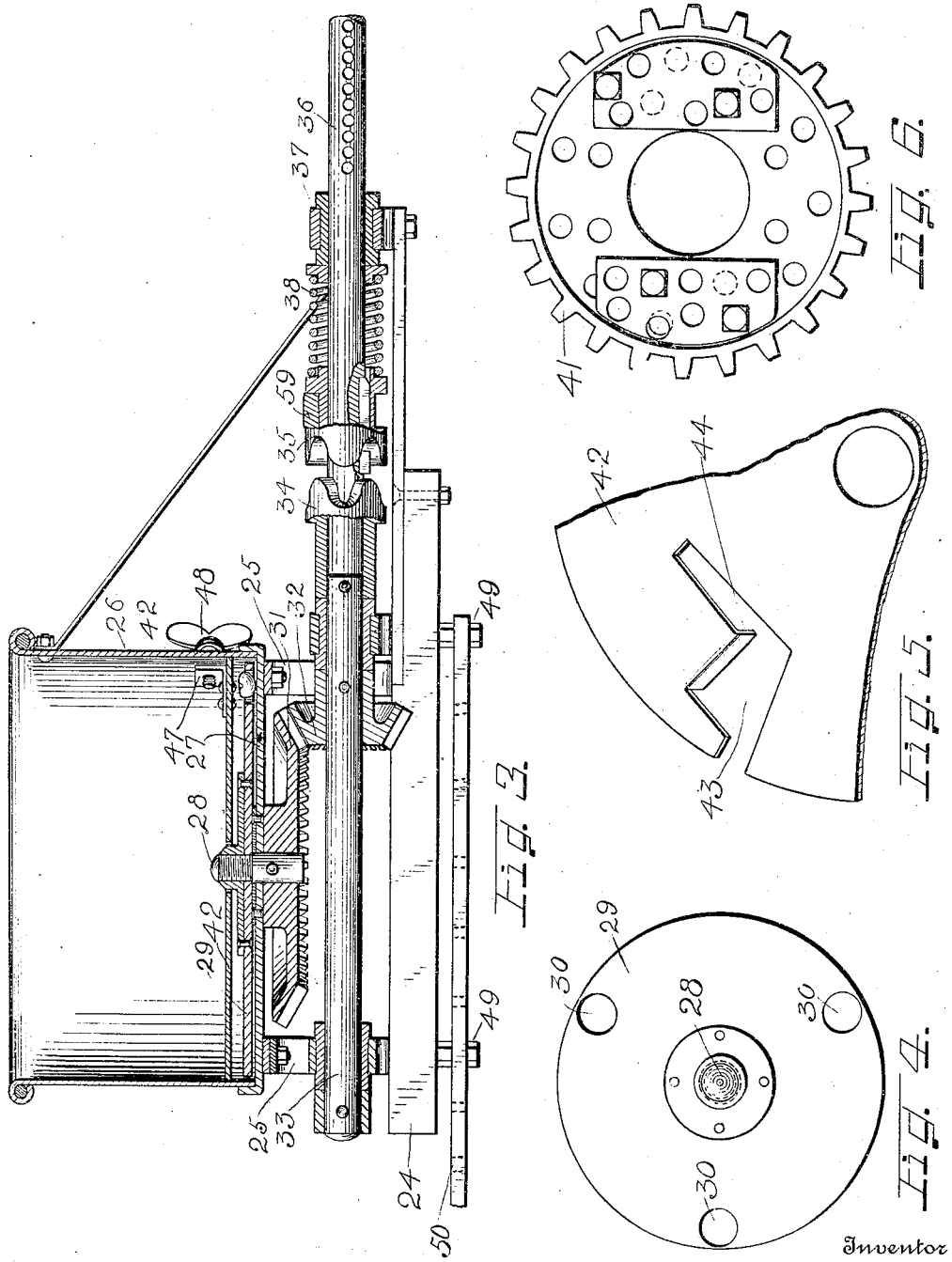

UNITED STATES PATENT OFFICE.

WILLIAM FAUST, OF HIGGINS, TEXAS.

REPLANTING ATTACHMENT FOR CULTIVATORS.

961,290.  Specification of Letters Patent.  Patented June 14, 1910.

Application filed October 30, 1909. Serial No. 525,517.

*To all whom it may concern:*

Be it known that I, WILLIAM FAUST, a citizen of the United States, residing at Higgins, in the county of Lipscomb, State of Texas, have invented certain new and useful Improvements in Replanting Attachments for Cultivators; and I do hereby declare the following to be a full, clear, and exact description of the invention, such as will enable others skilled in the art to which it appertains to make and use the same.

The invention relates to a replanting attachment for cultivators and more particularly to the class of planting attachments for riding cultivators.

The primary object of the invention is the provision of an attachment of this character that may be mounted upon the ordinary riding cultivator so that when the same is in operation corn or other seed may be planted in a field where the growing corn has been thinned out or destroyed by insects.

Another object of the invention is the provision of an attachment of this character which is capable of being adjusted so that the same may be mounted on the frame of varying types of riding cultivators and in which the planting of the seed or in other words the discharge of seed from the planter is at all times under the control of an operator.

A further object of the invention is the provision of a planter attachment which is simple in construction, readily and easily mounted upon a cultivator, thoroughly reliable and efficient in operation and inexpensive in the manufacture.

In the drawing accompanying and forming part of this specification, is illustrated the preferred form of embodiment of the invention, which to enable those skilled in the art to carry the invention into practice, will be set forth at length in the following description, while the novelty of the invention will be pointed out in the claims succeeding the description.

In the drawings:—Figure 1 is a top plan view of a cultivator with the invention applied thereto. Fig. 2 is a rear elevation thereof. Fig. 3 is a fragmentary vertical sectional view through the planter. Fig. 4 is a plan view of the seed disk removed from the planter. Fig. 5 is a fragmentary plan view of the stationary disk for the planter showing in detail the discharge opening therein for the seed disk. Fig. 6 is a plan view of the detachable driving gear adapted to be carried by one of the wheels of the cultivator.

Similar reference characters indicate corresponding parts throughout the several views in the drawings.

Referring to the drawings by numerals 8 designates generally a riding cultivator which is of the ordinary well known construction comprising a centrally arched axle 9, upon the opposite ends of which are mounted supporting wheels 10, and to the arch of this axle 9, is suitably fixed the main frame of the cultivator comprising spaced horizontally disposed side bars 11, which extend forwardly and rearwardly of the axle and have their forward ends bent inwardly to form right angular extensions 12, between which latter is connected a draft tongue or pole 13, the same being connected at its rear end to a bridge piece or bracket 14, vertically disposed and fixed upon a U-shaped cross brace bar 15, the latter being secured to the forward portion of the frame. To the rear ends of the side bars 11 is connected a downwardly bowed rear cross brace bar 16, to the center of which is fixed a seat 17, to be occupied by the operator of the machine.

To the U-shaped cross bar 15, of the frame is connected in the usual manner doubletrees 18, to which latter are adapted to be attached draft animals to enable a machine to be drawn through a field. This cross bar 15, is braced by tie rods 19, connected thereto and to the side bars of the frame. Also connected to the inward extensions 12, and the side bars 11, are brace rods 20, which serve to give rigidity to the main frame of the machine.

Connected to the front of the main frame by pivots 21, are downwardly and rearwardly extending cultivator beams or frames 22, the same supporting the usual cultivator blades 23, which latter are adapted to travel at opposite sides of growing corn or plants arranged in rows. It is obvious that these cultivator frames 22, are capable of vertical movement relative to the ground.

The corn planter attachment for the cultivator comprises a supporting frame 24, which latter is preferably of rectangular shape and has rising therefrom vertical supports 25, to which latter is connected a cylindrical seed hopper 26, in the bottom 27, of which is centrally journaled a short spindle 28, the latter having detachably threaded thereon a seed disk 29, containing a series of discharge openings 30, the sizes of which may be varied to accord with the quality of seed to be discharged from the hopper by substituting another seed disk with larger or smaller openings for said seed disk 29. Also fixed to this spindle 28, is a toothed gear 31, the latter meshing with a pinion 32, fixed to a horizontal shaft 33, suitably journaled in bearings above the frame 24, supporting the hopper. Fixed to this shaft 33, at one end is a toothed clutch member 34, the latter adapted to be engaged by a similar sliding clutch member 35, longitudinally keyed upon a shaft 36, mounted in suitable bearings 37, to aline with the shaft 33, and surrounding this shaft 36, is a coiled expansion spring 38, the latter acting upon the clutch member 35, to normally hold it in engagement with the clutch member 34, so that motion from the shaft 36, will be imparted to the shaft 33, and through the medium of the pinion 32 and gear 31, the seed disk will be caused to rotate.

Mounted for longitudinal adjustment on the shaft 36, is a sprocket wheel 39, over which latter is trained a sprocket chain 40; the same also being trained over a driving sprocket wheel 41, detachably connected by means of fasteners suitable therefor to one of the supporting wheels 10, of the cultivator, and in this manner when the machine is advanced rotary motion will be imparted to the seed disk for discharging seed from the hopper for planting purposes.

Detachably mounted within the hopper 26, is a stationary disk 42, which latter contains a seed discharge opening 43, and integral with this disk 42 adjacent its discharge opening is a depending scraper lip 44, which latter is adapted to contact with the revolving seed disk 29, to hold the seed so that it will be fed through the discharge opening 30, in said seed disk after the seed has been delivered thereon through the discharge opening 43, in the supplemental bottom 42, from the hopper and in this manner the seed is delivered from the hopper into a seed spout 45, on to the ground. The said seed spout 45, has its lower end held connected to a swinging hanger 46, so that the spout may be adjusted laterally to the desired degree between the cultivator frames as the occasion may demand.

The supplemental bottom 42, within the hopper has secured at diametrically opposite points thereof, vertical lugs 47, the latter engaged by thumb screws 48, carried by the hopper 26, and in this manner the supplemental bottom 42, may be removed at will from the hopper to enable the detachment of the seed disk 29, so that the latter may be replaced by other seed disks when desired.

The supporting frame 24, upon which is mounted the hopper 26, is adjustably connected by bolts 49, to parallel arms 50, the latter being formed with inwardly converging angular terminals 51, adjustably connected by bolts 52, to a pivotal vertical adjustable arm 53, the pivot 54, of which connects it with a supporting plate 55, detachably mounted on the axle 9, of the cultivator by clips 56. The vertically adjustable arm 53, is held rigid by braces 57, connected thereto by a pin 58, and also to the plate 55, by one of the clips 56, holding said plate on the axle of the cultivator machine.

Connected to the supporting frame 24, by a pivot 58', is the forward end of a clutch operating lever 59, the same suitably engaging the sliding clutch member 35, so that it may be moved into and out of engagement with the clutch member 34, for starting and stopping the corn planter at the will of an operator. Adjustably connected to this clutch operating lever 59, is an extensible handle 60, the same being disposed in approximate relation to the seat 17, for the easy and convenient handling by an operator when occupying the seat of the cultivator.

It is obvious that by the varying adjustments of the parts or adjunct portions of the corn planter attachments it will enable the same to be readily and easily mounted upon cultivators of varying types, therefore the invention is not confined to the employment of the cultivator shown herein as the device is obviously adaptable to other styles of cultivators.

What is claimed is:—

1. The combination with a cultivator having a wheeled axle, of a supporting plate detachably secured to the cultivator, an arm pivotally connected with the plate, brackets connected with the arm, a frame adjustably connected to the brackets, braces connected to the arm to hold the brackets in fixed position, a seed hopper mounted upon the frame, a sprocket detachably connected to one of the wheels, a rotatable shaft supported by the frame, seed distributing mechanism within the hopper and operated by the shaft, a sprocket fixed to the shaft, and a sprocket chain trained over the said sprockets.

2. The combination with a cultivator having a wheeled axle, of a supporting plate detachably secured to the cultivator, an arm pivoted to the plate, brackets connected with the arm, a frame adjustably connected to the brackets, braces connected to the arm to hold the brackets in fixed position, a seed hopper mounted upon the frame, a sprocket detachably connected to one of the wheels, a rotatable shaft supported by the frame, seed distributing mechanism within the hopper and operated by the shaft, a sprocket fixed to the shaft, a sprocket chain trained over the said sprockets, a clutch controlling the shaft, and a manually operable lever actuating the clutch.

In testimony whereof, I affix my signature, in presence of two witnesses.

WILLIAM FAUST.

Witnesses:
 JAMES WHEAT,
 E. M. DAWSON.